(12) United States Patent
Lachenmaier et al.

(10) Patent No.: US 10,086,819 B2
(45) Date of Patent: Oct. 2, 2018

(54) METHOD FOR REDUCING EXHAUST GAS EMISSIONS DURING A TRANSIENT TRANSITIONAL PHASE OF A VEHICLE

(71) Applicant: Robert Bosch GmbH, Stuttgart (DE)

(72) Inventors: Sebastian Lachenmaier, Stuttgart (DE); Johannes Zeller, Stuttgart (DE); Michael Bachner, Stuttgart (DE); Andreas Greis, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 167 days.

(21) Appl. No.: 15/008,408

(22) Filed: Jan. 27, 2016

(65) Prior Publication Data

US 2016/0221566 A1 Aug. 4, 2016

(30) Foreign Application Priority Data

Feb. 4, 2015 (DE) .......................... 10 2015 201 905

(51) Int. Cl.
| | |
|---|---|
| *B60W 20/00* | (2016.01) |
| *F01N 9/00* | (2006.01) |
| *F02D 41/04* | (2006.01) |
| *F02D 41/10* | (2006.01) |
| *F02N 11/04* | (2006.01) |

(52) U.S. Cl.
CPC .............. *B60W 20/00* (2013.01); *F01N 9/005* (2013.01); *F01N 9/007* (2013.01); *F02D 41/045* (2013.01); *F02D 41/10* (2013.01); *F01N 2590/11* (2013.01); *F01N 2900/0412* (2013.01); *F02D 2200/0406* (2013.01); *F02D 2250/21* (2013.01); *F02D 2250/36* (2013.01); *F02N 11/04* (2013.01)

(58) Field of Classification Search
None
See application file for complete search history.

(56) References Cited

U.S. PATENT DOCUMENTS

| | | | | |
|---|---|---|---|---|
| 5,703,777 | A * | 12/1997 | Buchhop | G01M 15/102 123/1 A |
| 9,689,335 | B2 * | 6/2017 | Ge | F02D 41/222 |
| 2007/0261654 | A1 * | 11/2007 | Butcher | F02B 21/00 123/179.18 |
| 2008/0154454 | A1 * | 6/2008 | Lehner | B60T 17/221 701/22 |
| 2008/0269009 | A1 * | 10/2008 | Marr | B60K 6/46 477/3 |
| 2009/0150059 | A1 * | 6/2009 | Santoso | F02D 41/0087 701/113 |
| 2009/0288645 | A1 * | 11/2009 | Childress | F02M 25/089 123/520 |

(Continued)

*Primary Examiner* — Nicholas K Wiltey
(74) *Attorney, Agent, or Firm* — Norton Rose Fulbright US LLP; Gerard Messina

(57) ABSTRACT

A method for reducing exhaust gas emissions during a transient transitional phase of a vehicle including an internal combustion engine and an electric machine or an alternative ancillary unit, the method including, in the transient transitional phase, over a period of time defined by a dynamic indicator for determining the transient transitional phase, a correction intervention is carried out by a load point reduction of the internal combustion engine and, simultaneously thereto, a torque substitution by a transient torque applied by the electric machine or the alternative ancillary unit.

8 Claims, 2 Drawing Sheets

(56) References Cited

U.S. PATENT DOCUMENTS

| | | | | |
|---|---|---|---|---|
| 2010/0011763 A1* | 1/2010 | Komatsu | ............... | F02B 37/013 60/602 |
| 2011/0144892 A1* | 6/2011 | Katsumata | .............. | F02D 23/00 701/104 |
| 2013/0054063 A1* | 2/2013 | Maier | .................... | B60K 6/442 701/22 |
| 2013/0213352 A1* | 8/2013 | Kumar | .................... | F02D 41/00 123/406.23 |
| 2014/0109868 A1* | 4/2014 | Zhu | ..................... | F02D 41/0072 123/349 |
| 2014/0207321 A1* | 7/2014 | King | .................... | B60L 11/123 701/22 |
| 2016/0146145 A1* | 5/2016 | Walder | ............... | F02D 41/0085 123/480 |

* cited by examiner

METHOD FOR REDUCING EXHAUST GAS EMISSIONS DURING A TRANSIENT TRANSITIONAL PHASE OF A VEHICLE

CROSS REFERENCE

The present invention claims the benefit under 35 U.S.C. § 119 of German Patent Application No. 102015201905.5 filed on Feb. 4, 2015, which is expressly incorporated herein by reference in its entirety.

FIELD

The present invention relates to a method for reducing exhaust gas emissions during a transient transitional phase of a vehicle. Furthermore, the present invention relates to a computer program, a machine-readable data carrier for storing the computer program, and an electronic control unit, with the aid of which the method may be carried out.

BACKGROUND INFORMATION

To meet the stricter limiting values for pollutant emissions, a variety of measures are used in contemporary engines, in particular to reduce the particle and nitrogen oxide emissions.

One measure is exhaust gas recirculation (EGR), which represents a contemporary means for preventing nitrogen oxide emissions. The oxygen content in the cylinder is reduced by exhaust gas recirculation and a reduction of the temperature in the combustion chamber results as a consequence thereof. The increase of the number of particles with increasing exhaust gas recirculation is problematic. The main reason for the higher particle emissions is the limitation of the oxygen, which is also required for the soot oxidation. The oxygen content, which is reduced by the exhaust gas recirculation, thus always has a decreasing effect on the nitrogen oxide emission and an increasing effect on the particle emission. A conflict of objectives arises therefrom between soot emissions and nitrogen oxide emissions, in particular in diesel engines.

Due to the previous statutory provisions for the exhaust gas test cycle, only low requirements were placed on the reduction of the pollutant emissions during dynamic operation for passenger automobiles. In the commercial vehicle sector, the dynamic operation was completely hidden by a stationary test.

The increasing requirements for modern diesel engines are characterized above all by the continuous tightening of the limiting values for pollutant emissions and by the introduction of new test cycles. These cycles will in future also consider the real driving operation within the scope of the certification for ascertaining realistic fuel consumption and emission values, which will be accompanied by a significant gain in dynamic response in the operational profile.

The dynamic driving operation and, linked thereto, the transient transitional behavior, will substantially enter the focus of further development and optimization efforts against this background.

The consideration of dynamic procedures requires in particular the consideration of load jumps or rapid load increases, as frequently occur in real driving operation and in future test cycles. Load jumps or rapid load increases result in a delayed buildup of the charge pressure due to the inertia of the air system in a diesel engine. The causes of this inertia are, inter alia, the moment of inertia of the turbocharger and the dead volume between the compressor and the intake valves of the engine. The injection system, which implements the load requirement of the driver, has a significantly shorter response time than the air system of the engine. A short-term and abrupt increase of the load, for example, an increase of the driver command torque, for example, during an acceleration procedure, therefore results in a system-related delayed torque buildup, which is reflected in sluggish response behavior of the diesel engine. This inertia is a consequence of the described behavior of the air system caused by dead times in the gas flow lines and due to the mass inertia of the compressor and results in a delayed charge pressure buildup in a reduced cylinder charge. This behavior displays emission-relevant effects in the air mass flow regulation, since, as a function of the transient driving state, a reduction of the EGR rate results in a massive increase of the NOx emissions. However, operation with a low air-fuel ratio along the smoke limit does not result in an increase of the soot emissions, but rather also in a limitation of the driver command torque at the expense of the drivability. In summary, it is thus to be stated that rapid load changes are expressed in a delayed torque buildup at the cost of drivability and in temporarily strongly increased emission peaks. This reflects the field of tension between driving performance and exhaust gas emission.

SUMMARY

An example method according to the present invention for reducing exhaust gas emissions during a transient transitional phase of a vehicle including an internal combustion engine and an electric machine may enable a significant improvement of the emission and driving behavior of transient driving states by a targeted load allocation between the internal combustion engine and the electric machine or an alternative ancillary unit with the aid of a transient correction intervention and therefore alleviates the described conflict of objectives between exhaust gas emissions and drivability.

In accordance with the present invention, the short-term load point of the internal combustion engine is reduced during a period of time defined by a dynamic indicator for determining the transient transitional phase and, simultaneously thereto, a torque is substituted by a transient torque applied by the electric machine or by the alternative ancillary unit. The short-term load point reduction of the internal combustion engine results in an emission reduction. The torque, for example, a driver command torque, is maintained in its entirety.

Expressed in another way, this type of the correction intervention may thus be triggered by a dynamic indicator, which detects a transient driving state. The detection of a transient driving state is the subject matter of the patent application (no prior publication) of the applicant having the applicant-internal file number R. 355 398, the content of which is incorporated in its entirety in the present application. Accordingly, the dynamic indicator for determining the transient transitional phase is determined from a relative charge pressure/intake manifold pressure deviation of a charge pressure regulation or intake manifold pressure regulation of the internal combustion engine.

According to one advantageous embodiment of the method, it is provided that the dynamic indicator is ascertained from a relative charge pressure/intake manifold pressure control deviation and a variable which characterizes the present engine speed, in particular by a two-dimensional characteristic map interpolation from a charge pressure/ intake manifold pressure deviation-engine speed characteristic map.

It is provided that a deviation of a setpoint value from an actual value of the charge pressure/intake manifold pressure regulation in relation to the present setpoint value is used as the relative charge pressure/intake manifold pressure control deviation.

The dynamic indicator is preferably a dimensionless variable, in particular in the value range between 0 and 1.

Furthermore, it is advantageously provided that the transient torque is determined from a product of a transient correction factor (TCF) and the maximum available torque of the electric machine or the alternative ancillary unit.

The transient correction factor is advantageously calculated as a product of a variable, which characterizes a degree of the correction intervention, and an indicator for determining a transient transitional phase.

The variable which characterizes the degree of the correction intervention is preferably taken from an empirically determined characteristic map, the input variables of which are a variable which characterizes the speed and a variable which characterizes the load of the internal combustion engine. In this characteristic map, the degree of the correction intervention is weighted specifically for the operating point in consideration of the full-load characteristic curve of the electric machine.

With the aid of this function of the transient correction, in case of a load jump, for example, for an acceleration phase, a direct and target-oriented load point reduction of the internal combustion engine results in lower setpoint value requirements, for example, of the air mass, which enables higher EGR rates (exhaust gas recirculation rates) in the case of an air quantity regulation and therefore results in lower nitrogen oxide emissions. As a function of the level of the torque substitution, a target-oriented nitrogen oxide reduction may take place relatively simply, without having to carry out complex adaptations of the basic application of the internal combustion engine. A lower setpoint value requirement of the injection quantity which results therefrom also has the advantage, depending on the starting and target operating state of the internal combustion engine, of causing only short-term to small torque limitation ("smoke limitation"), whereby not only torque reserves may be maintained and higher levels of driving performance are possible, but rather also a smaller number of particles are emitted.

A specified driver command torque is formed from the total of the transient torque applied by the electric machine or the alternative ancillary unit and a torque applied by the internal combustion engine during the load point reduction.

The example computer program according to the present invention is configured to carry out each step of the method, in particular when it is run on a computer or a control unit. It enables the implementation of the example method according to the present invention on an electronic control unit, without having to carry out structural modifications thereon. The machine-readable data carrier is provided for this purpose, on which the computer program according to the present invention is stored. By loading the computer program according to the present invention onto an electronic control unit, the electronic control unit according to the present invention is obtained, which is configured to carry out, in the transient transitional phase via a period of time defined by the dynamic indicator for determining the transient transitional phase, a correction intervention by a load point reduction of the internal combustion engine and, simultaneously thereto, a torque substitution by a transient torque applied by the electric machine or the alternative ancillary unit.

Further advantages and embodiments of the present invention result from the description and the figures.

It shall be understood that the above-mentioned features and the features still to be explained hereafter are usable not only in the particular specified combination, but rather also in other combinations or alone, without departing from the scope of the present invention.

DETAILED DESCRIPTION OF EXAMPLE EMBODIMENTS

Figure 1:
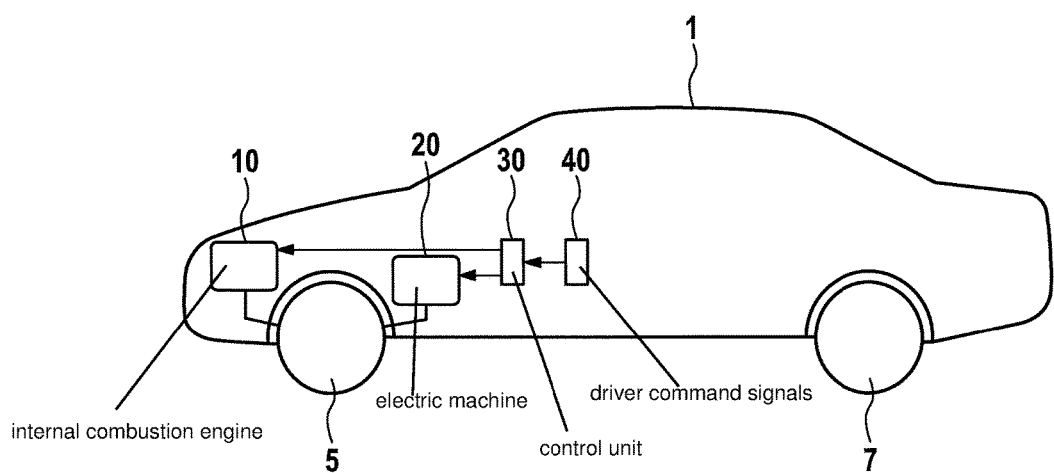
FIG. 1 schematically shows a vehicle including an internal combustion engine and an electric machine, in which the example method according to the present invention is used.

FIG. 1 shows a vehicle 1, which has an internal combustion engine 10 and an electric machine 20, which are both controllable by an electronic control unit 30. Both internal combustion engine 10 and electric machine 20 act via a drivetrain (not shown) on drive wheels 5, in the case shown as a front-wheel drive. A drive of rear wheels 7 or both wheels (all-wheel drive) is also possible in principle. Driver command signals 40, for example, a driver command torque, are supplied to control unit 30.

Figure 2:
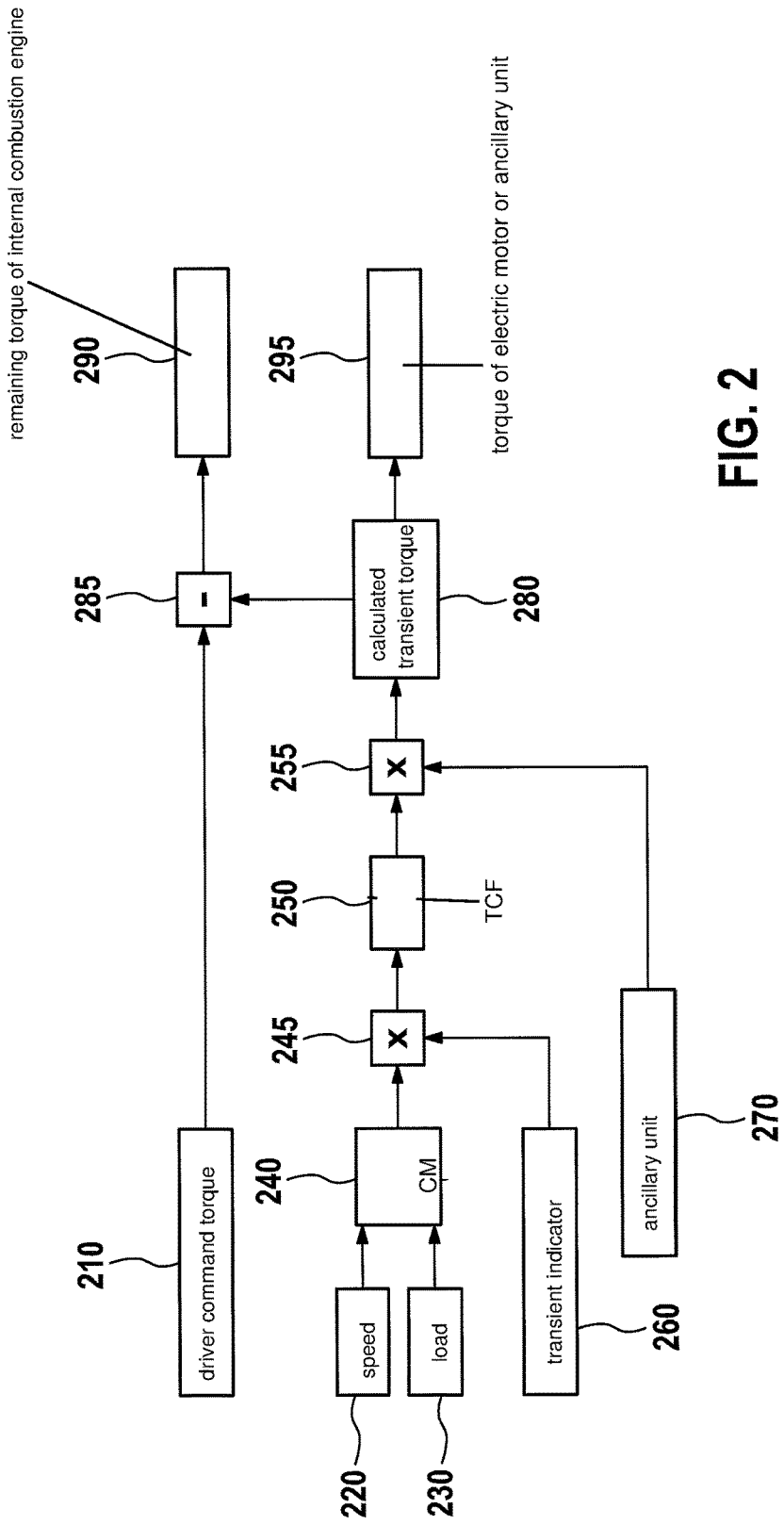
FIG. 2 shows a block diagram, which illustrates the calculation of the transient correction according to one embodiment of the method according to the present invention.

To improve the emission and driving behavior of transient driving states, the present invention provides a target-oriented load allocation between internal combustion engine 10 and electric machine 20 or an alternative ancillary unit with the aid of a transient correction intervention, whereby the conflict of objectives described at the outset between the exhaust gas emissions and the drivability is alleviated. The method according to the present invention will be explained hereafter in conjunction with FIG. 2. A description of the present operating point is required for calculating the correction intervention. This description of the present operating point takes place, for example, by way of the speed and the load as input variables. Speed 220 and load 230 are supplied to a characteristic map (CM) 240. Characteristic map 240 is parameterized according to a degree of the correction intervention between 0 (no intervention) and 1 (maximum intervention). The output variable of characteristic map 240 is multiplied, step 245, by a transient indicator 260, the value range of which is also between 0 and 1, whereby a transient correction factor (TCF) results, step 250.

Transient indicator 260 is determined in a way as described in the application (no prior publication) of the applicant having the applicant-internal file number R. 355 398, to which reference is made in the present case and the content of which is incorporated in its entirety in the present application. The transient correction factor determined in step 250 is thus the product of a quantitative description of a transient state (0 to 1) and a quantitative evaluation of the level of the intervention of electric machine 20 or of the ancillary unit. The level of the transient torque intervention, i.e., the transient torque provided in step 280, is in turn a product of transient correction factor 250 and a maximum torque of electric machine 20 or of ancillary unit 270, which is calculated in step 255. This is based on the maximum torque of electric machine 20 or of the ancillary unit available in this operating point in step 270. Driver command torque 210 is reduced by this value of calculated transient torque 280. This means that transient torque 280 is subtracted from driver command torque 210 in step 285, so that driver command torque 210 represents the total of remaining torque 290 of the internal combustion engine and torque 295 of electric motor 20 or of the ancillary unit. The core of the present invention is thus, in the case of an event triggered by a transient procedure, to carry out a short-term load point reduction of internal combustion engine 10 in conjunction with a torque substitution by an electric machine 20 or an alternative ancillary unit to reduce the exhaust gases, predominantly the nitrogen oxides, to thus avoid negative effects on the driving performance.

In principle, it is also possible to provide a closed control loop between an internal combustion engine and an electric machine/ancillary unit, in that control deviations between setpoint torque and actual torque of the one unit are corrected by way of an adapted torque allocation.

Likewise, for better quantification of the nitrogen oxide emissions to be reduced, direct parameters such as cylinder charge and oxygen concentration, which participate in the emission creation, may be used as input variables for determining the transient correction factor.

What is claimed is:

1. A method for reducing exhaust gas emissions during a transient transitional phase of a vehicle, the vehicle including an internal combustion engine and an electric machine or an alternative ancillary unit, the method comprising:
   in the transient transitional phase, over a period of time defined by a transient indicator for determining the transient transitional phase, carrying out a correction intervention by a load point reduction of the internal combustion engine to reduce the exhaust gas emissions during the transient transitional phase of the vehicle; and
   simultaneously with the carrying out, substituting a torque by a transient torque applied by the electric machine or the alternative ancillary unit;
   wherein the transient torque is determined from a product of a transient correction factor and the maximum available torque of the electric machine or the alternative ancillary unit,
   wherein a present operating point is required for calculating a correction intervention, wherein the present operating point is described by a speed and a load as input variables, which are supplied to a characteristic map, which is parameterized according to a degree of the correction intervention between a value of 0 for no intervention and a value of 1 for a maximum intervention,
   wherein a prior driver command torque is reduced by the transient torque, and
   wherein the transient indicator for determining the transient transitional phase is a dimensionless variable, in a value range between 0 and 1.

2. The method as recited in claim 1, wherein the transient indicator for determining the transient transitional phase is ascertained from a relative charge pressure/intake manifold pressure control deviation and a variable which characterizes the present engine speed, by way of a two-dimensional characteristic map interpolation from a charge pressure/intake manifold pressure deviation-engine speed characteristic map.

3. The method as recited in claim 2, wherein a deviation of a setpoint value from an actual value of the charge pressure/intake manifold pressure regulation in relation to the present setpoint value is used as the relative charge pressure/intake manifold pressure control deviation.

4. The method as recited in claim 1, wherein the transient correction factor is calculated as a product of a variable which characterizes a degree of the correction intervention and the transient indicator for determining the transient transitional phase.

5. The method as recited in claim 4, wherein the variable which characterizes the degree of the correction intervention is taken from an empirically determined characteristic map, the input variables of which are a variable which characterizes the speed and a variable which characterizes the load of the internal combustion engine.

6. The method as recited in claim 1, wherein a driver command torque is formed by a total of the transient torque applied by the electric machine or the alternative ancillary unit and a torque applied by the internal combustion engine during the load point reduction.

7. A non-transitory machine-readable storage medium on which a computer program is stored, the computer program being executable by a processor, comprising:
   a program code arrangement having program code for causing the processor to perform:
   in the transient transitional phase, over a period of time defined by a transient indicator for determining the transient transitional phase, carrying out a correction intervention by a load point reduction of the internal combustion engine; and
   simultaneously with the carrying out, substituting a torque by a transient torque applied by the electric machine or the alternative ancillary unit;
   wherein the transient torque is determined from a product of a transient correction factor and the maximum available torque of the electric machine or the alternative ancillary unit,
   wherein a present operating point is required for calculating a correction intervention, wherein the present operating point is described by a speed and a load as input variables, which are supplied to a characteristic map, which is parameterized according to a degree of the correction intervention between a value of 0 for no intervention and a value of 1 for a maximum intervention,
   wherein a prior driver command torque is reduced by the transient torque, and
   wherein the transient indicator for determining the transient transitional phase is a dimensionless variable, in a value range between 0 and 1.

8. An electronic control unit, comprising:
   a controller configured to, at a transient transitional phase of a vehicle over a period of time which is defined by a transient indicator for determining the transient transitional phase, determine and carry out a load point reduction of the internal combustion engine and, simultaneously thereto, perform a torque substitution by a transient torque built up by an electric machine or an alternative ancillary unit;
   wherein the transient torque is determined from a product of a transient correction factor and the maximum available torque of the electric machine or the alternative ancillary unit,
   wherein a present operating point is required for calculating a correction intervention, wherein the present operating point is described by a speed and a load as input variables, which are supplied to a characteristic map, which is parameterized according to a degree of the correction intervention between a value of 0 for no intervention and a value of 1 for a maximum intervention,
wherein a prior driver command torque is reduced by the transient torque, and
wherein the transient indicator for determining the transient transitional phase is a dimensionless variable, in a value range between 0 and 1.

* * * * *